F. R. FOSTER.

Grain Separator.

No. 95,674.

Patented Oct. 12, 1869.

United States Patent Office.

F. R. FOSTER, OF BRANDON, WISCONSIN.

Letters Patent No. 95,674, dated October 12, 1869.

IMPROVEMENT IN GRAIN-SEPARATORS.

The Schedule referred to in these Letters Patent and making part of the same.

*To all whom it may concern:*

Be it known that I, F. R. FOSTER, of Brandon, in the county of Fond-du-Lac, and State of Wisconsin, have invented a new and useful Improvement in Grain-Separators, of which the following is a full, clear, and exact description.

The object of my invention is to separate oats from wheat automatically without the use of moving-mechanism.

My invention is based on the principle that in a mass of moving particles of different specific gravities, the lighter substance will come to the surface; and The improvement herein claimed consists in a novel method of separating wheat from oats, or other substances, of lighter specific gravity than wheat, by causing them to flow down an inclined perforated trough, the oats rising to the top of the mass, and being discharged over the end of the spout, while the wheat falls through the perforations, and escapes by a different channel.

In the accompanying drawings—

Figure 1:
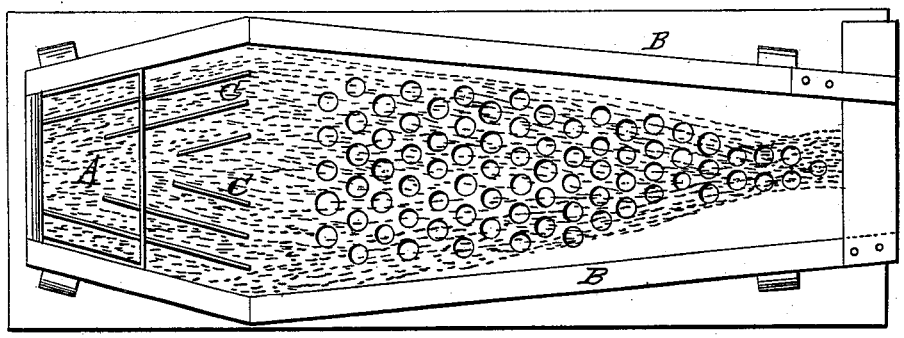

Figure 1 is a plan, and

Figure 2:
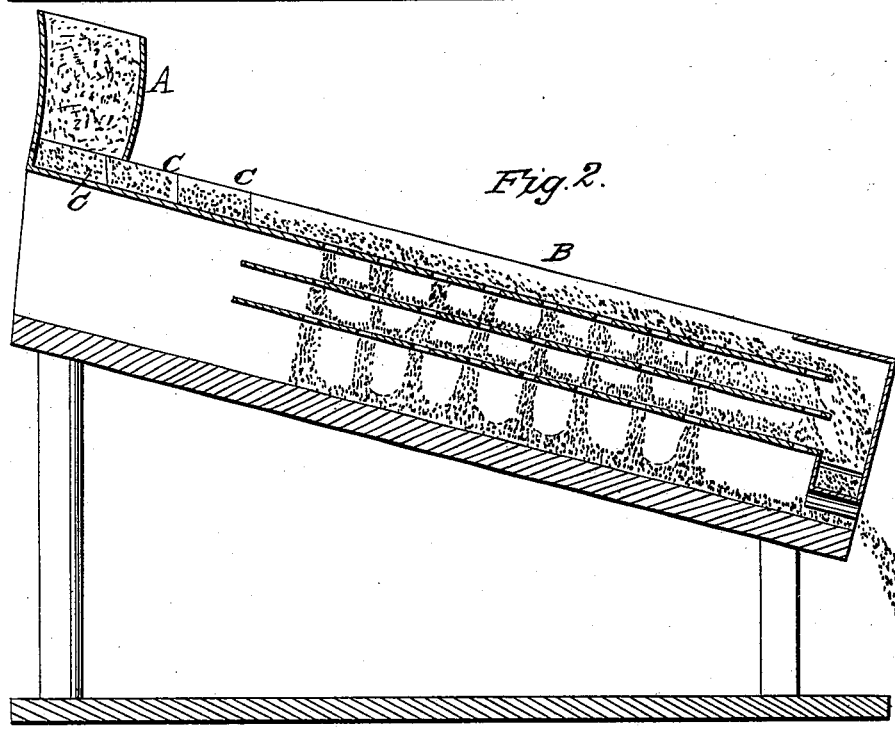

Figure 2, a vertical central section through so much of the apparatus as is necessary to illustrate my invention.

A spout, A, provided with a suitable valve, leads from an elevator, or other receptacle, into an inclined trough, B, which is, by preference, suspended in bearings in such manner that either end can be raised or lowered to vary the angle of inclination of the trough, and consequently the rapidity of the flow of the current of grain. This trough would answer a good purpose if made with a flat perforated bottom and parallel sides. I have, however, found it beneficial to construct the trough of a coffin-shape, as shown in the drawings, and slightly concave on the bottom.

I also prefer to make the bottom of sheet-metal, perforated with round holes, leaving a space near the edges unperforated, and gradually diminishing the number of holes toward the lower end, as shown in fig. 1.

I have also found it advantageous to spread the grain over the upper end of the trough, in a stream wider than the spout, which I do by means of deflecting-boards C, arranged beneath the spout.

The operation is as follows:

The mixed stream of wheat and oats flows through the spout A into the trough B, and is spread by the deflectors C.

I prefer not to perforate that portion of the trough beneath the deflectors, as the flow is so rapid there that the oats, as well as the wheat, might be driven through.

As the grain passes down the trough after leaving the deflectors, the wheat (shown in red in the drawing) sinks to the bottom, and falls through the perforations, while the oats (shown in blue) being lighter, rise to the surface and pass off into a suitable receptacle at the lower end of the trough.

The oats are long and bearded, while the wheat is round and smooth. The oats, therefore, will readily slide over a hole, through which the wheat would drop.

Two or more sieves may be arranged, one below the other, as shown in the drawings, to insure the more perfect separation.

By making the screen concave, the stream will always flow in the centre of the trough.

As the size of the stream is constantly diminishing by the escape of the wheat through the screen, I diminish the number of openings, correspondingly, at the lower end of the trough.

I am thus enabled to separate the grain without the use of mechanism, while simply flowing from one receptacle to another.

What I claim as my invention, and desire to secure by Letters Patent, is—

1. The method, herein described, of separating wheat from oats, or other substances of lighter specific gravity.

2. The coffin-shaped perforated trough, constructed as described, for the purposes set forth.

3. The combination of the spout, the deflectors, and the trough, all constructed as set forth, for the purpose specified.

4. Constructing the screen with a diminishing number of holes toward the lower end, as and for the purpose set forth.

In testimony whereof, I have hereunto subscribed my name.

F. R. FOSTER.

Witnesses:
C. W. FERGUSON,
R. C. KELLY.